Nov. 1, 1960  W. G. SPEAR  2,958,779
SCINTILLATION EXPOSURE RATE DETECTOR
Filed April 6, 1959
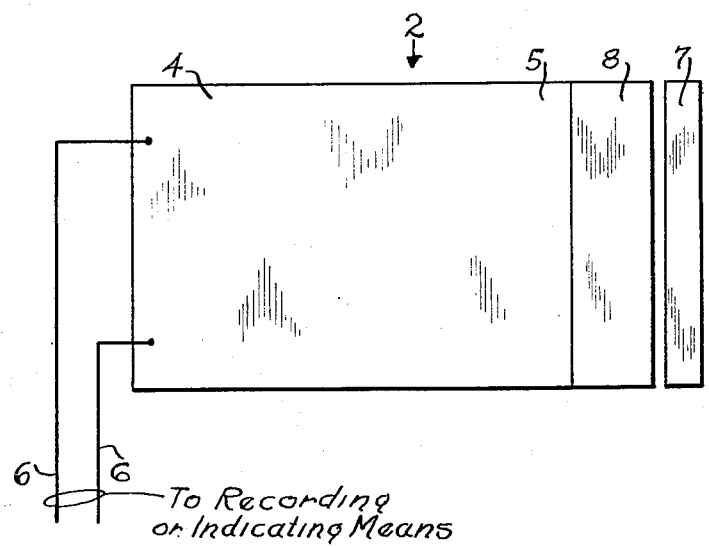
To Recording
or Indicating Means
INVENTOR.
Ward G. Spear
BY
Attorney

United States Patent Office 2,958,779
Patented Nov. 1, 1960

2,958,779

SCINTILLATION EXPOSURE RATE DETECTOR

Ward G. Spear, Richland, Wash., assignor to the United States of America as represented by the United States Atomic Energy Commission Filed Apr. 6, 1959, Ser. No. 804,552

2 Claims. (Cl. 250—71.5)

This invention relates to radiation detectors and, more particularly, to scintillation detectors for gamma and X rays.

Present scintillation detectors generally employ a crystal, such as thallium-activated sodium iodide, that scintillates, i.e. emits light photons, when exposed to radiation. Ordinarily, a photomultiplier tube is optically coupled to the crystal, the photomultiplier tube converting the photons to a corresponding amplified electrical signal, which electrical signal may be fed to an indicating or recording device and used as a measure of the incident radiation.

The light photon output of crystals in scintillation detectors is proportional to the quantity of radiation to which the crystal is exposed; this is desirable since it is desired to obtain a measure of the quantity of radiation via the scintillation detector. The quantity of radiation is defined in roentgens, one roentgen being that quantity of gamma or X rays that will produce one electrostatic unit of ions of one polarity in either cc. of air at STP. However, scintillation crystals are also sensitive to the energy level of the radiation, i.e. the crystal provides a greater light photon output for a given quantity of low energy radiation than for the same quantity of high energy radiation. The energy level of radiation is expressed in electron volts, one electron volt being the energy imparted to an electron by acceleration through a potential difference of one volt. The variable sensitivity of crystals with energy level is undesirable in applications where it is desired to measure the quantity of radiation irrespective of the energy level thereof.

One object of the present invention is to provide a means for making the photon response of a radiation-sensitive crystal substantially independent of the energy level thereof, the photon output of the radiation-sensitive element being dependent only upon the quantity of radiation.

Another object of the present invention is to provide a thallium-activated sodium iodide crystal scintillation detector whose sensitivity is substantially independent of the energy level of the radiation being detected.

Other objects will be made manifest by the following description and the accompanying schematic drawing.

Referring now to the schematic drawing, a scintillation detector 2 is shown. Detector 2 consists of a photomultiplier 4 having an optical input end 5 and an electrical output 6, a tantalum shield member 7, and a scintillation crystal 8 disposed between the input end of the photomultiplier and the shield member 7, the crystal being optically coupled to the photomultiplier. The electrical output signal 6 from the photomultiplier is fed to suitable means for recording or indicating the incident radiation. Optical coupling between crystal 8 and photomultiplier 4 may be provided by commercially available means or by close physical disposition.

In one preferred embodiment of the present invention, crystal 8 is a thallium-activated sodium iodide crystal of 1.0-mm. thickness, and the tantalum shield member 7 is a sheet of 0.030-inch thickness.

In operation, crystal 8 emits more light photons when exposed to a given quantity of low energy radiation than when exposed to the same quantity of high energy radiation. Tantalum shield member 7 attenuates a given quantity of low energy radiation more severely than the same quantity of high level radiation. Stated another way, the response curve of crystal 8 for a given quantity of radiation at various energy levels substantially corresponds with that of the corresponding attenuation curve of shield member 7. By proper choice of material and thickness, shield member 7 can be made to compensate almost perfectly for the variable response with energy level to radiation of crystal 8. In this way, the combined response of shield member 7 and crystal 8 to a given quantity of radiation will be constant regardless of the energy level of the incident radiation. As a result, the combined response of shield member 7 and crystal 8 will depend only upon the total quantity of radiation, being substantially independent of the energy level thereof.

Tests were performed by exposing the 1.0-mm. thick thallium-activated sodium iodide crystal and 0.030-inch thick tantalum sheet of the preferred embodiment with gamma and X rays ranging in energy from 40 kev. to 5 mev. Over this range, the dose rate indicated by detector 2 was within ±20% of the true dose rate. This degree of accuracy is acceptable for most radiation monitoring situations. It has been found that this accuracy is possible for gamma and X ray intensities as low as 0.05 milliroentgen per hour over the energy range of 40 kev. to 5 mev.

It will be appreciated that the present invention may be employed to make the response of crystals other than sodium iodide substantially energy independent. In any case, the material and thickness of the crystal and the thickness of the tantalum shield member need only be such that the combined response to a given quantity of radiation at various energy levels is substantially constant.

It is intended to limit the invention only by the scope of the appended claims.

What is claimed is:

1. A radiation detector for gamma and X rays comprising a thallium-activated sodium iodide crystal sensitive to gamma and X rays and having a photon output responsive thereto, photosensitive means optically coupled to said crystal, and a tantalum shield member disposed adjacent said crystal on the side remote from said photosensitive means, the absorption versus energy level characteristic of said shield member corresponding substantially with the photon response versus energy level characteristic of said crystal over the energy range 40 kev. to 5 mev.

2. A radiation detector for gamma and X rays comprising a thallium-activated sodium ioxide crystal having a thickness of about one millimeter, said crystal being sensitive to gamma and X rays and having a photon output responsive thereto, photosensitive means optically coupled to said crystal, and a tantalum shield member having a thickness of about 0.030 inch disposed adjacent said crystal on the side remote from said photosensitive means.

References Cited in the file of this patent

UNITED STATES PATENTS

| | | |
|---|---|---|
| 2,617,955 | Mandeville et al. | Nov. 11, 1952 |
| 2,686,268 | Martin et al. | Aug. 10, 1954 |
| 2,727,154 | Goldsworthy | Dec. 13, 1955 |
| 2,752,505 | Klick | June 26, 1956 |
| 2,768,308 | Schultz | Oct. 23, 1956 |
| 2,830,187 | Scherbatskoy | Apr. 8, 1958 |
| 2,854,584 | Youmans | Sept. 30, 1958 |
| 2,855,520 | Stoddard et al. | Oct. 7, 1958 |
| 2,862,106 | Scherbatskoy | Nov. 25, 1958 |

OTHER REFERENCES

Price et al.: Radiation Shielding, published by Pergamon Press (New York), 1957, page 182.